March 9, 1965 W. R. LAUPER 3,172,453
POSITION CONTROL FOR MULTIPLE TOOLS
Filed Dec. 31, 1962 5 Sheets-Sheet 1
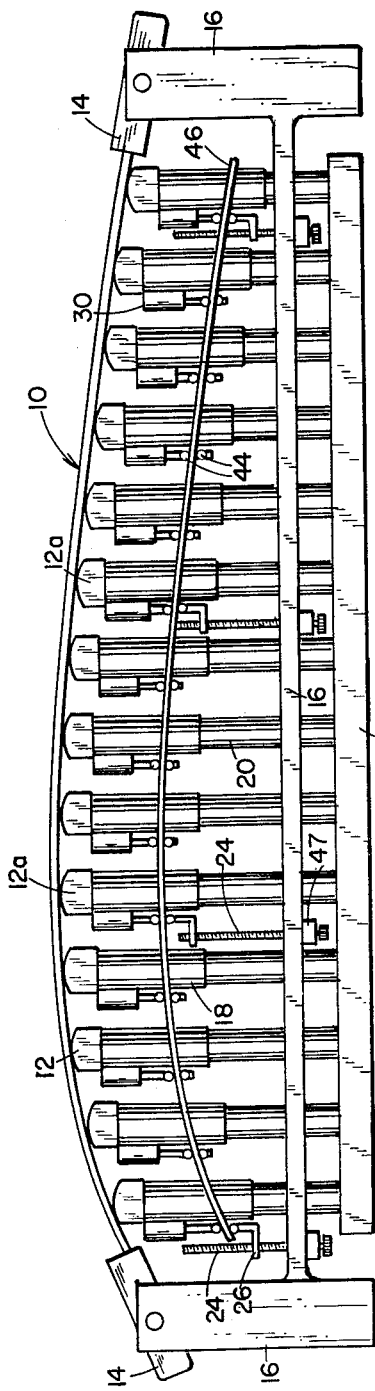
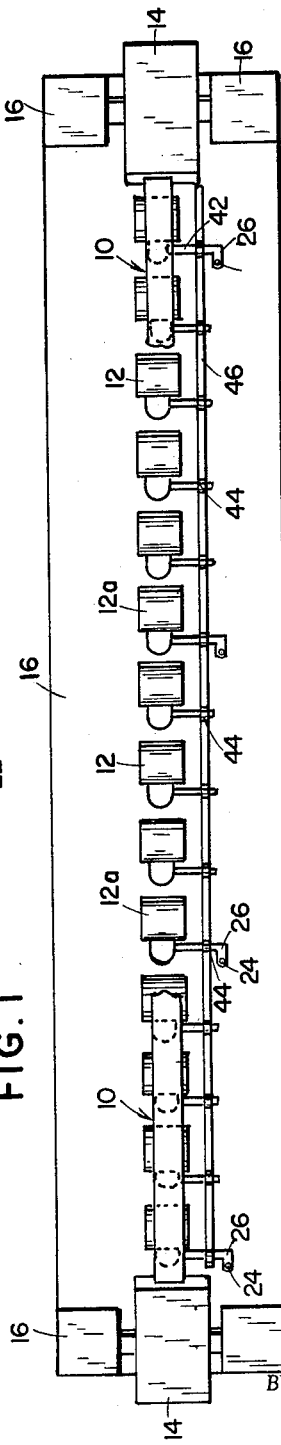
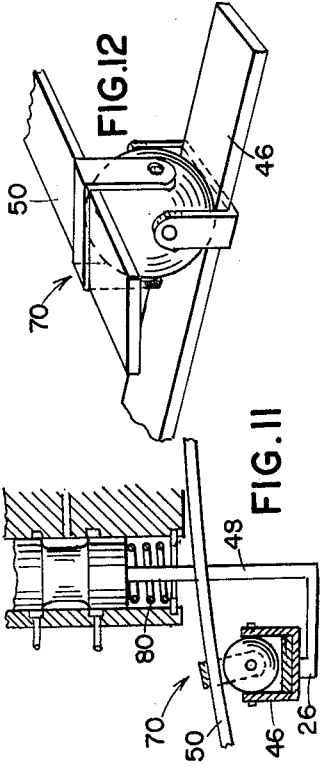
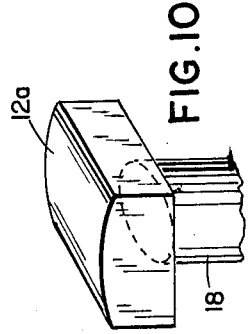
INVENTOR.
Warner R. Lauper
BY Moses, McGlew & Toren
ATTORNEYS.

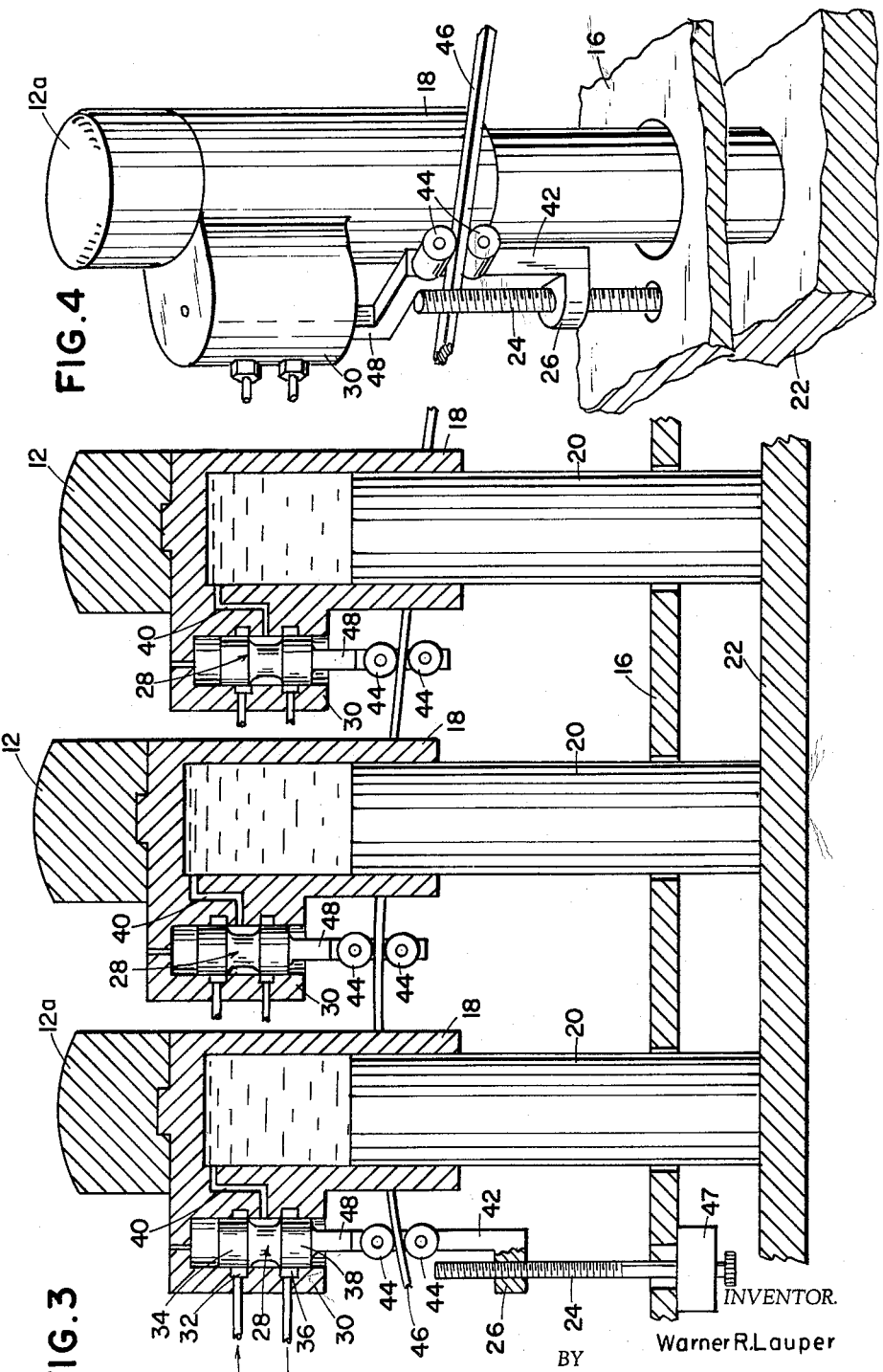

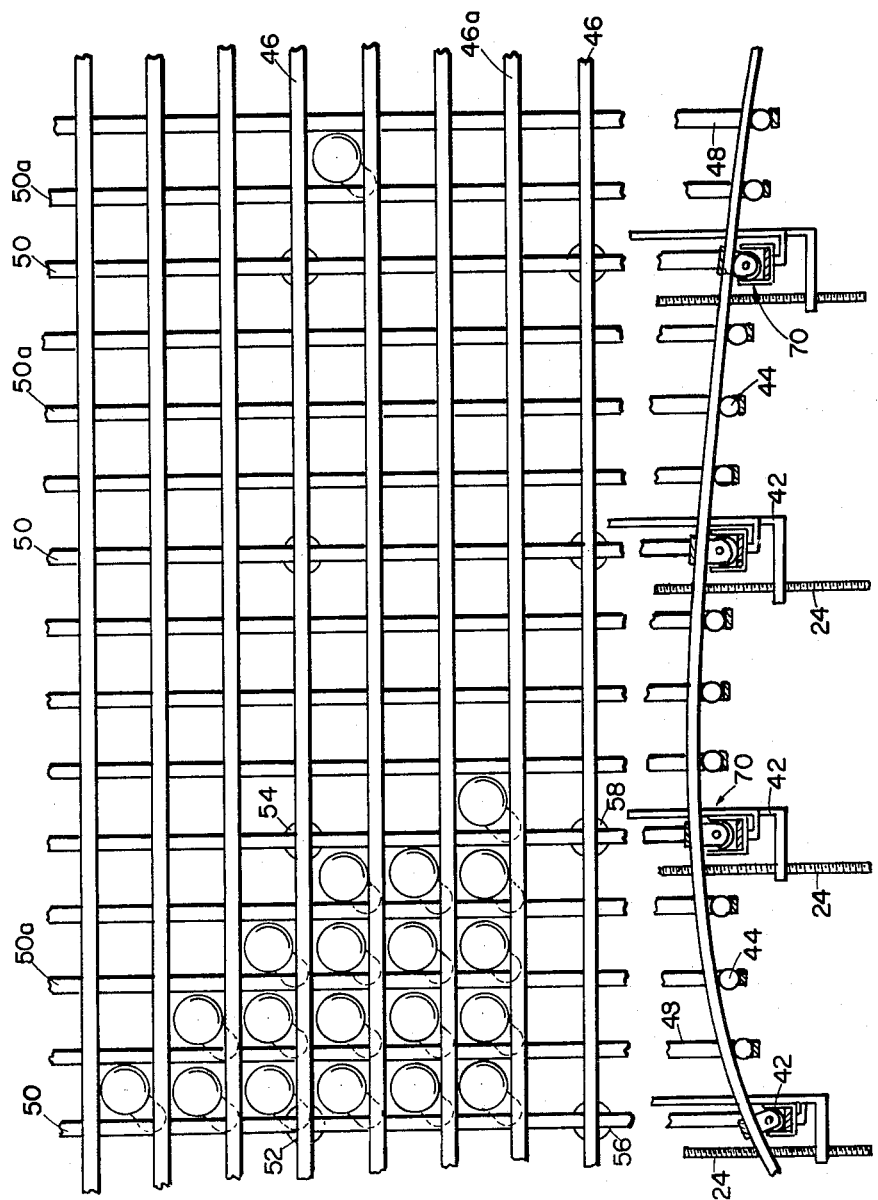

March 9, 1965  W. R. LAUPER  3,172,453
POSITION CONTROL FOR MULTIPLE TOOLS
Filed Dec. 31, 1962  5 Sheets-Sheet 4

INVENTOR.
Warner R. Lauper

BY Moses, Mc.Glew & Toren
ATTORNEYS.

March 9, 1965 W. R. LAUPER 3,172,453
POSITION CONTROL FOR MULTIPLE TOOLS
Filed Dec. 31, 1962 5 Sheets-Sheet 5
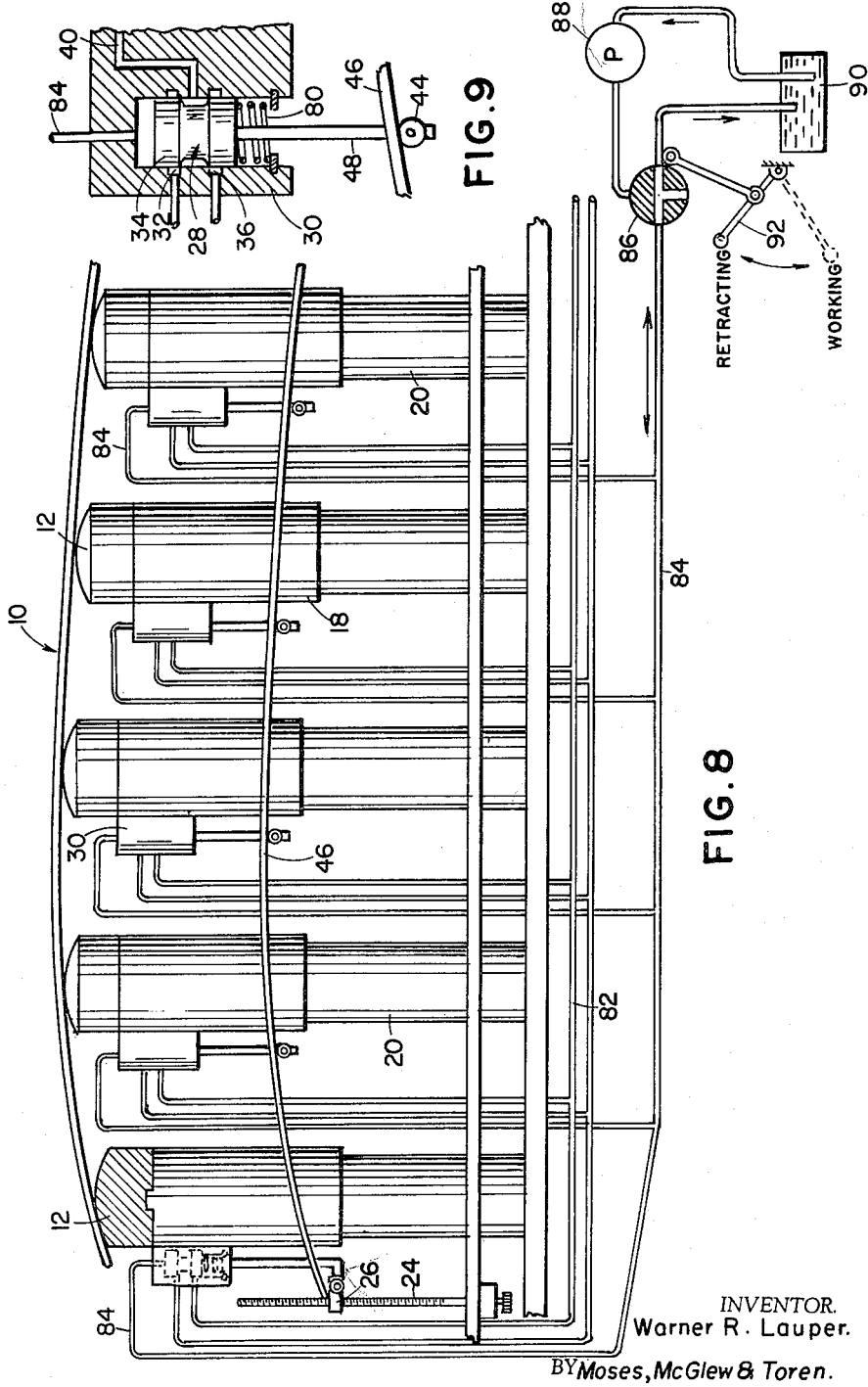
INVENTOR.
Warner R. Lauper.
BY Moses, McGlew & Toren.
ATTORNEYS.

United States Patent Office 3,172,453
Patented Mar. 9, 1965

3,172,453
POSITION CONTROL FOR MULTIPLE TOOLS
Warner R. Lauper, San Pedro, Calif., assignor to Todd Shipyards Corporation, a corporation of New York
Filed Dec. 31, 1962, Ser. No. 248,552
15 Claims. (Cl. 72—212)

This invention relates to a multiple purpose templet, form or mold for preparing faired curves or work pieces in the form of faired curves. The invention comprises the use of a multiple element templet, form or mold wherein the positions which certain elements are to occupy are known, and such elements are set in the known positions, whereupon the positions of intermediate elements are interpolated automatically so as to cause the entire templet, form or mold to assume the desired faired curved shape. This is accomplished by the use of a flexible beam or spline which is shaped by the setting of the known points, the spline thereupon assuming the desired faired curved shape, and through secondary control mechanism causing all the intermediate templet elements to automatically assume the correct intermediate positions.

Where a great many parts of identical shape are to be produced, it is customary to provide a templet, die or mold carefully machined or hand finished by die or tool makers to the desired formation whereupon any number of duplicates of the shape desired may be produced from it. However, where only a limited number of parts of any particular shape is needed, then the cost of providing a preformed tool is too great and it is economical to provide a tool, die or templet formed of sections which may be adjusted to different shapes. The adjustment of the numerous sections forming the multiple-sectioned tool, however, presents many difficulties. The primitive method of doing this is to adjust each part or section of the tool, templet or die by hand to the desired extent, but this may involve separate adjustment of scores or even hundreds of sections, which is a very tedious, costly procedure. Where the finished product is to be given the shape of a faired curve, that is, a curve in which the various elements merge gradually along a predetermined line or surface configuration, the present invention provides for the setting up of the tool or die by the manual or primarily controlled automatic adjustment of a relatively small number of sections at spaced intervals, intermediate elements of the tool or die being automatically controlled by the setting of the pre-set sections so as to give the complete desired curved shape.

The making of multiple part templets and dies, in which all of the parts are separately adjusted manually, not only requires an excesive amount of labor, but also presents difficulties in that access to the large number of adjusting devices is difficult. Attempts have also been made to provide an automatic control operated by punched tape mechanism or equivalent primary control means for each of the movable elements or segments of the tool, but such mechanism is complicated and equipment costs are excessive.

The present invention is capable of use in many relationships such as the production of multiple purpose forming dies, templets for plotting or drafting, guides or templets for the control of torch-cutting or milling machines, molds, and for other similar purposes.

An example of such a utility of the present invention is found in the shaping of ship plates where large sections of heavy steel have to be formed into the proper faired curve shape but only a few pieces will be shaped the same way so that a repeated resetting of the tool or die is necessary. The workpiece such as a metal plate may be formed into a two-dimensional shape as by a simple bending operation, or the workpiece may be curved in more than one plane so as to form a three-dimensional shape.

The application of the invention to a metal plate bending machine has been chosen as illustrative and is shown in the accompanying drawings and described below. It is to be understood, however, that the invention is not limited to this particular application, but may be applied in various ways as above indicated.

In the accompanying drawings certain preferred examples of a plate bending machine have been shown, but these are illustrative only of the members thereof, all embodiments of which are intended to be covered by the appended claims.

In the accompanying drawings:

FIG. 1 is a side elevation of a multiple tool construction for producing a plate or workpiece formed along a faired curve in one direction only, being referred to as a two-dimensional curvature;

FIG. 2 is a plan view of the arrangement shown in FIG. 1;

FIG. 3 is a vertical sectional view through a group of tool elements showing one adjustable element which may be positioned by manual adjustment or by means of a primary automatic control, and two elements adjusted by servo-mechanism or secondary control devices;

FIG. 4 is a perspective view of one of the manually or primarily adjustable tool elements;

FIG. 5 is a plan view similar to FIG. 2 showing an arrangement of tools for bending a plate in two directions so as to produce a three-dimensional curved formation;

FIG. 6 is a diagrammatic side elevation of the construction shown in FIG. 5, the intermediate servo-controlled tool elements not being completely illustrated;

FIG. 8 is a side elevation of a multiple tool construction provided with means for permitting the tool elements to be withdrawn from contact with the workpiece and restored to the original setting without changing the adjustment of the spline;

FIG. 9 is a vertical sectional view through one of the valve chambers in the construction shown in FIG. 8 showing a spring-urged valve;

FIG. 10 is a perspective view of one of the tool heads of the form shown in FIGURES 1 and 2;

FIG. 11 is a vertical sectional view of one of the valve chambers with the spring-urged valve, showing a detail of the crossing splines as shown in FIG. 5, and the swivel bearing between the two; and FIG. 12 is a perspective view of two of the crossing splines and the swivel bearing between them.

Figure 7:
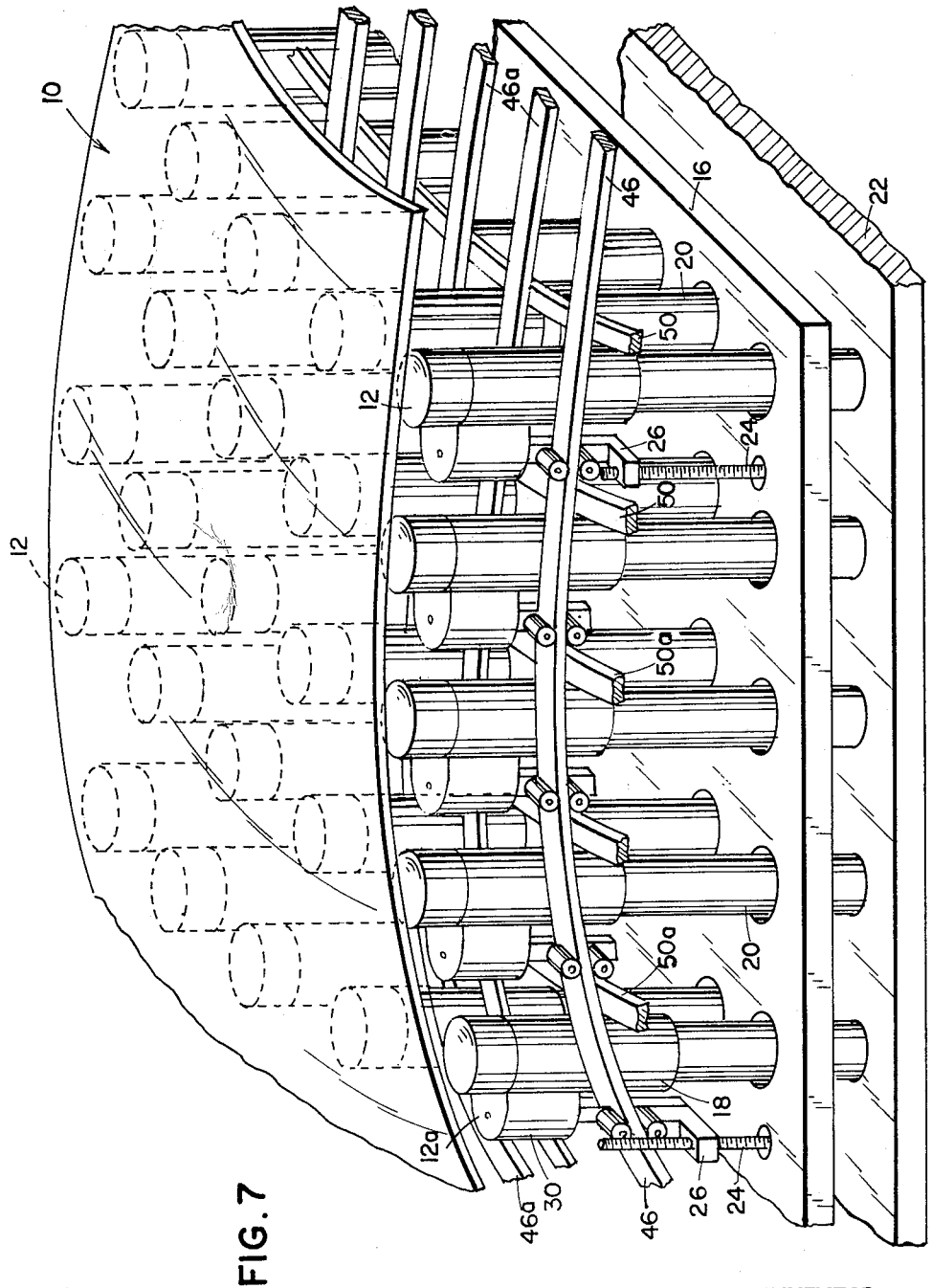
FIG. 7 is a perspective view showing the tool elements for forming a plate of compound curvature, this figure being somewhat diagrammatical and the details of construction not being shown.

Referring to the drawings in detail, 10 is the workpiece, for example, a ship's plate which is to be formed into a faired curve by being drawn over the ends of the tool or die sections 12 and 12a. In the example shown, the plate 10 is stretched-formed by being attached at its edges to tensioning devices 14 which are mounted on the machine. The tool elements 12 and 12a are mounted on hydraulic cylinders 18 which slide upon and are positioned by stationary pistons 20 mounted on the frame 16 or on a solid support such as the base plate or floor 22 under the frame 16. Certain of the tool or die elements such as those indicated at 12a are adjustable to the proper height by means such as the adjusting screws 24 which are screwed through nut members 26 connected to servo-valve spools 28 which are adjusted along their axes within the valve bodies or chambers 30 on the sides of the cylinders 18. A pressure port 32 is covered by the upper land 34 of the valve spool 28 and an exhaust port 36 is covered by the lower land 38 of the spool when the spool is in its neutral position. A hole or pipe 40 connects the valve chamber and the cylinder port. With the spool in its neutral position, no hydraulic fluid can pass to or from the cylinder which is held fixedly in its position. Lowering the spool will close the pressure port and open the exhaust port, draining sufficient fluid from the cylinder to drop the latter and the valve body until equilibrium is established. Lifting the spool will uncover the pressure port while keeping the exhaust port closed, allowing more fluid to enter the cylinder and lift the same together with the valve body until again equilibrium is established.

The nut member 26 has a vertical portion 42 (FIGS. 3 and 4) which connects it with the stem 48 of the valve spool 28. On this vertical portion are mounted a pair of rollers 44 between which pass the flexible beam or spline 46. The flexible beam or spline in most instances is of constant cross section or bendability, but this is not essential as long as its bendable character is as shown.

The screw 24 is rotated by means of a manual or automatic device 47 and thereby determines the adjustment of the tool element associated with the particular control unit and also the position of the spline at this point as determined by the rollers 44. The device for rotating the screw may be a knurled head, crank or the like for direct manual manipulation or may be a motor controlled by automatic or semi-automatic means of any suitable nature, such as by a punched tape or the like, such means not being illustrated. The rollers 44 permit endwise movement of the spline so as to allow for the up and down adjustment without interference from the spline. The spline thereupon automatically assumes the shape of the desired faired curve.

The intermediate tool elements 12 are controlled automatically by the position of the spline which passes between rollers 44 of the stems 48 of the valve spools 28 working in the valve casings 30 of the intermediate cylinders 18. Thus, the intermediate tool elements 12 are all automatically set so that the faired shape of the plate is produced as it is stretched over the faces of the tool elements. Once the setting of the tool elements has been established by the secondary control means or servomechanisms as controlled by the shape of the spline, they are hydraulically locked in position so that the effect is equal to that of a solid, preformed die of the desired shape. At the same time, when it is desired to produce a plate of different curvature, it is only necessary to adjust a few spaced controls, whereupon all of the intermediate tool elements are automatically set by the servomechanisms as controlled by the shape assumed by the spline.

The invention may be applied to the formation of a plate curved in two directions so as to form a three-dimensional shape. Such an arrangement is shown in FIG. 5, 6 and 7, in which two sets of splines are arranged at right angles to each other so as to form a network. In this case, the longitudinal set of splines is indicated at 46, 46a, and a transverse set of splines is shown at 50, 50a. The control splines 46 and 50 are provided with adjustable controls at the crossing points indicated at 52, 54, 56 and 58. The splines 46a, 50a between the control splines may be referred to as servo-splines or slave splines.

Swivel joints or bearing devices are placed at crossing points between splines to keep them at a constant distance and prevent twisting. Such swivel bearings are indicated at 70 in FIGS. 5, 6, 11 and 12.

While the illustrated embodiments of the invention show the control valves for the various tool actuating cylinders directly mechanically connected to the spline, it is obvious that a low pressure system might be employed for controlling the high pressure cylinder valves, the low pressure system being provided with pilot valves formed for engagement and actuation by the splines.

In the form of the invention as shown in FIGS. 3 and 4, the spline passes between pairs of rollers connected to the cylinder valves so that the spline controls the movements of the valves in both directions through mechanical engagement. As shown in FIGS. 6, 8 and 11, in some instances each valve might be actuated by a roller engaging one side of the spline only, the valve being spring loaded as indicated at 80 so as to hold this roller in contact with the spline. In such a construction it would be possible to retract the tool segments while leaving the spline in its pre-set position simply by draining the fluid from the cylinders 18. This would permit the tool segments to be withdrawn from contact with the workpiece before removing the workpiece.

Draining of the liquid from the cylinders 18 may be accomplished in any suitable manner, for instance, by moving the valve spools 28 down so as to connect the passages 40 with the exhaust ports 36. As shown, this is done by providing a manifold 82 which is connected by branches 84 with the spaces at the tops of the valve chambers 30. Introduction of liquid under pressure into these spaces will force down the valve spools against the pressure of the springs 80 and release the liquid in the cylinders 18. When the next workpiece is to be formed, the unformed plate 20 may be inserted in the machine and the tools 12 returned to and located in their initial positions by moving the three-way valve 86 so as to cut off the pressure which was applied to force down the valve spools and permit the springs 80 to push up the valve spools until the rollers engage the spline, thereby permitting the liquid to be forced again into the cylinders 18 until they reach their equilibrium positions, as already described. Liquid under pressure may be supplied to the manifold 82 in any suitable manner, as from the pump 88, the liquid being let out of the manifold system to a tank 90 on operation of the three-way valve. The three-way valve may be actuated in any suitable manner, as by hand lever 92.

While a specific embodiment of the invention has been shown and described in detail to illustrate the application of the inventive principle, it will be understood that the invention may be embodied otherwise and used for various purposes as above indicated without departing from such principles.

In the claims "templet" is used in a generic sense to include a part having a curved forming or guide surface.

I claim:

1. An adjustable templet instrumentality comprising a plurality of adjustable templet sections and means for setting up said sections to form a faired curve, certain of said sections comprising control sections located at intervals spaced along the curve to be formed, means under the control of the operator for bringing such spaced control sections into known positions with respect to said curve, a bendable spline connected with said spaced control sections and bendable into shape as determined by the adjusted positions of said control sections, and means associated with the intermediate templet sections controlled by the bendable spline for setting the said intermediate sections in positions to produce with the control sections a faired curve of the desired shape.

2. A construction as claimed in claim 1, in which said intermediate sections are provided with servo-mechanisms controlled by the curvature of said spline.

3. A construction as claimed in claim 2, in which said servo-mechanisms are hydraulic.

4. An adjustable templet instrumentality comprising a plurality of adjustable templet sections and means for setting up said sections to form a faired curve, certain of said sections comprising control sections located at intervals spaced along the curve to be formed, means under the control of the operator for bringing such spaced control sections into known positions with respect to said curve, a bendable spline connected with said spaced control sections and bendable into shape as determined by the adjusted positions of said control sections, hydraulic cylinders operatively connected with the intermediate templet sections, stationary pistons upon which said hydraulic cylinders are movable, valve chambers on each of said cylinders movable therewith, valves movably mounted in each of said valve chambers, and valve actuating means engaged with said spline for selectively setting said valves so as to set the cylinders and templet sections connected therewith in predetermined positions depending upon the curvature of the spline.

5. A construction as claimed in claim 4 in which the spline is constructed to assume the form of a faired curve when adjusted at predetermined intervals.

6. A construction as claimed in claim 4 in which the spline-engaging means are rollers.

7. An adjustable templet instrumentality comprising a plurality of adjustable templet sections and means for setting up said sections to form a faired curve, certain of said sections comprising control sections located at intervals spaced along the curve to be formed, means under the control of the operator for bringing such spaced control sections into known positions with respect to said curve, a bendable spline connected with said spaced control sections and bendable into shape as determined by the adjusted positions of said control sections, hydraulic cylinders operatively connected with the intermediate templet sections, stationary pistons upon which said hydraulic cylinders are movable, valve chambers on each of said cylinders movable therewith, valves movably mounted in each of said valve chambers, rollers carried by said cylinders engageable with said spline, and a fluid pressure system for moving said valves for selectively setting said valves so as to set the cylinders and templet sections connected therewith in predetermined positions depending upon the curvature of the spline.

8. A construction as claimed in claim 7 in which the fluid pressure system includes ducts for introducing fluid under pressure into the ends of the valve chambers so as to displace the valves against the resistance of the springs and thereby move the valve-actuating rollers out of contact with the spline, and valve means for releasing the pressure in the fluid pressure system, so that the springs may restore the rollers to contact with the spline and thereby re-set the templet sections in formation as determined by the curvature of the spline.

9. An adjustable templet instrumentality comprising a plurality of adjustable templet sections and means for setting up said sections to form a compound curved surface, curved along faired curves in intersecting planes, certain of said sections comprising control sections located at intervals spaced along the curves to be formed, means under the control of the operator for bringing such spaced control sections into known positions with respect to said curve, a plurality of crossing splines bendable respectively in said intersecting planes and connected with said spaced control sections and bendable into shapes as determined by the adjusted positions of said control sections, and means associated with the intermediate templet sections controlled by the bendable splines for setting the said intermediate sections in positions to produce with the control sections, faired curves of the desired shapes.

10. A construction as claimed in claim 9 in which said intermediate sections are provided with servo-mechanisms controlled by the curvature of said splines.

11. A construction as claimed in claim 9 in which the crossing splines are separated at their crossing points by swivel bearings.

12. An adjustable tool for forming a workpiece, comprising a plurality of individually adjustable work-engaging tool elements, means for clamping a workpiece in position for engagement by said tool elements, hydraulic cylinder and piston means for determining the position of each said tool element, means under the control of an operator for pre-setting certain of said tool elements in predetermined positions, bendable spline means connected with said operator-controlled elements, the setting of which will cause the bending of said spline to a desired shape, others of said adjustable tool elements not under direct operator control being provided with servo-means engaged with said spline so as to set said elements in accordance with the curvature of the spline.

13. A forming tool comprising a plurality of separately adjustable tool elements, means for clamping a workpiece in a position for engagement by said elements, hydraulic cylinders carrying each of said tool elements, stationary pistons upon which said hydraulic cylinders are movable, valve chambers on each of said cylinders, valves movably mounted in said valve chambers, a bendable spline, valve actuating means having formations for engagement with said spline for selectively setting said valves to cause said spaced cylinders to set the tool elements carried thereby in predetermined positions and also to set said bendable spline at predetermined points so as to give the spline a desired shape, the valves controlling the cylinders between said pre-set cylinders being adjusted by engagement with the bendable spline so as to cause the tool elements associated with the intermediate hydraulic cylinders to assume positions depending upon the shape of the spline.

14. An adjustable templet instrumentality comprising a plurality of adjustable templet sections and means for setting up said sections to form a faired curve, certain of said sections comprising control sections located at intervals spaced along the curve to be formed, means under the control of the operator for bringing such spaced control sections into known positions with respect to said curve, a bendable spline connected with said spaced control sections and bendable into shape as determined by the adjusted positions of said control sections, hydraulic cylinders operatively connected with the intermediate templet sections, stationary pistons upon which said hydraulic cylinders are movable, valve chambers on each of said cylinders movable therewith, valves movably mounted in each of said valve chambers, spring means biasing said valve so as to urge said spline engaging means into contact with one surface of said spline, and valve actuating means engaged with cylinders and templet sections connected therewith in predetermined positions depending upon the curvature of the spline.

15. A device for forming a workpiece, comprising means for clamping a workpiece in a manner permitting at least a portion to be formed by bending, a plurality of tool elements mounted having templet forming ends disposed adjacent said clamping means in a position to form a bending templet for a workpiece when clamped in said clamping means, means mounting said tool elements for movement toward and away from said clamping means, bendable spline means engaged by each of said tools at a spaced location from the templet forming ends thereof, said spline means being bendable in accordance with the relative positions in which the tool elements hold said spline means, and means connected to said tool elements for positioning said tool elements to achieve a desired curve form as indicated by the outline of said spline and thus form the similar bending templet at the ends thereof.

References Cited by the Examiner
UNITED STATES PATENTS

| | | | |
|---|---|---|---|
| 279,394 | 6/83 | Kichline | 153—51 |
| 1,328,538 | 1/20 | Newberg et al. | 33—176 |
| 1,460,286 | 6/23 | Stenhouse | 269—309 |

CHARLES W. LANHAM, *Primary Examiner.*